(12) United States Patent
Su et al.

(10) Patent No.: US 12,189,171 B2
(45) Date of Patent: Jan. 7, 2025

(54) DISPLAY APPARATUS INCLUDING FIRST LIGHT SOURCE MODULE ON DISPLAY SURFACE OF DISPLAY PANEL AND SECOND LIGHT SOURCE MODULE ON BACK SURFACE OF DISPLAY PANEL

(71) Applicant: HannStar Display Corporation, Taipei (TW)

(72) Inventors: Chen-Hao Su, Taichung (TW); Chin-Wei Lin, Tainan (TW); Chin-Yung Liu, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/519,050

(22) Filed: Nov. 26, 2023

(65) Prior Publication Data

US 2024/0353611 A1    Oct. 24, 2024

(30) Foreign Application Priority Data

Apr. 21, 2023    (CN) .......................... 202310435558.1

(51) Int. Cl.
*F21V 8/00* (2006.01)
*G02F 1/1335* (2006.01)
*G02F 1/13357* (2006.01)

(52) U.S. Cl.
CPC .......... *G02B 6/0076* (2013.01); *G02B 6/002* (2013.01); *G02B 6/0068* (2013.01); *G02B 6/0073* (2013.01); *G02B 6/0088* (2013.01); *G02B 6/0091* (2013.01); *G02F 1/133603* (2013.01); *G02F 1/133615* (2013.01); *G02F 1/133616* (2021.01); *G02F 1/133555* (2013.01); *G02F 1/133621* (2013.01); *G02F 1/133626* (2021.01); *G02F 2203/09* (2013.01)

(58) Field of Classification Search
CPC .... G02B 6/002; G02B 6/0073; G02B 6/0076; G02B 6/0091; G02F 1/133555; G02F 1/133602–133613; G02F 1/133615–133616; G02F 1/133621; G02F 1/133626; G02F 2203/09
See application file for complete search history.

(56) References Cited

U.S. PATENT DOCUMENTS

| | | | |
|---|---|---|---|
| 2006/0007102 A1* | 1/2006 | Yasuoka | G09G 3/3611 345/102 |
| 2016/0238773 A1* | 8/2016 | Shei | G02B 6/0076 |
| 2020/0158937 A1* | 5/2020 | Chang | G02B 6/0088 |

FOREIGN PATENT DOCUMENTS

| | | |
|---|---|---|
| TW | 200619767 | 6/2006 |
| TW | M633107 | 10/2022 |
| TW | 202314347 | 4/2023 |
| WO | 2005078514 | 8/2005 |

* cited by examiner

Primary Examiner — Keith G. Delahoussaye
(74) Attorney, Agent, or Firm — JCIPRNET

(57) ABSTRACT

A display apparatus including a display panel, a first light source module, and a second light source module is disclosed. The display panel has a display surface and a back surface away from the display surface. The first light source module is disposed on a side of one of the display surface and the back surface of the display panel, and overlaps the display surface. The second light source module is disposed on a side of the other one of the display surface and the back surface of the display panel, and overlaps the display surface.

9 Claims, 9 Drawing Sheets

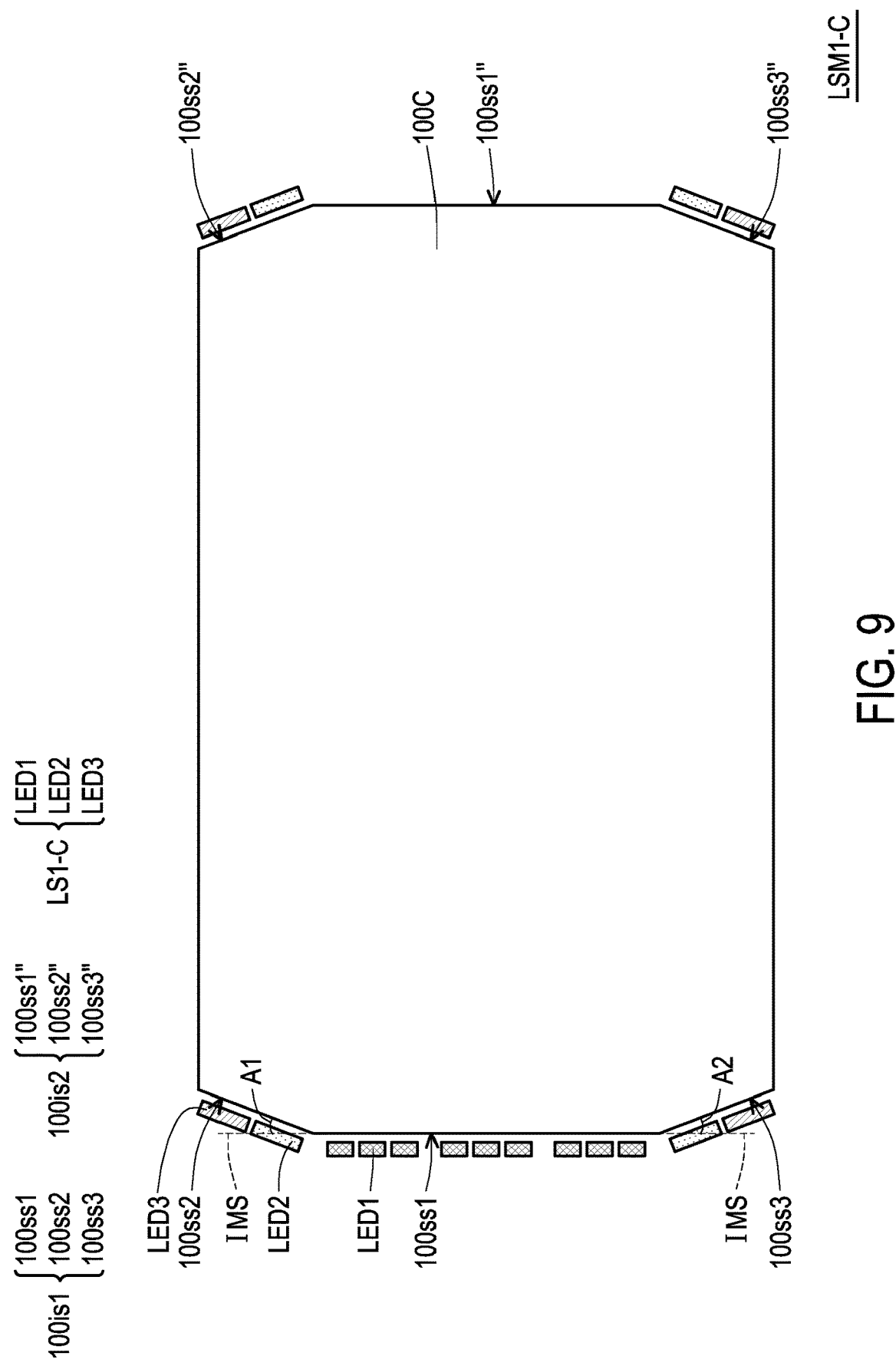

DISPLAY APPARATUS INCLUDING FIRST LIGHT SOURCE MODULE ON DISPLAY SURFACE OF DISPLAY PANEL AND SECOND LIGHT SOURCE MODULE ON BACK SURFACE OF DISPLAY PANEL

CROSS-REFERENCE TO RELATED APPLICATION

This application claims the priority benefit of China application serial no. 202310435558.1, filed on Apr. 21, 2023. The entirety of the above-mentioned patent application is hereby incorporated by reference herein and made a part of this specification.

BACKGROUND

Technical Field

This disclosure relates to a display technology, and more particularly, to a display apparatus.

Description of Related Art

In order to meet display requirements of different usage scenarios, a transflective (or micro transflective) display panel came into being. When the outdoor sunlight is sufficient, the transflective (or micro transflective) display panel may display under the sunlight without using a built-in back light source, so as to achieve a purpose of energy saving. When the ambient light in a room is insufficient, the transflective (or micro transflective) display panel is required to display under auxiliary illumination of the back light source, which not only consumes power, but also affects display quality.

SUMMARY

The disclosure provides a display apparatus, in which a configuration of a light source and adjustment of characteristics are relatively flexible.

A display apparatus in the disclosure includes a display panel, a first light source module, and a second light source module. The display panel has a display surface and a back surface away from the display surface. The first light source module is disposed on a side of one of the display surface and the back surface of the display panel and overlaps the display surface. The second light source module is disposed on a side of the other one of the display surface and the back surface of the display panel and overlaps the display surface.

In an embodiment of the disclosure, the first light source module of the display apparatus includes a first light guide structure and a first light source. The first light guide structure has a first light incident surface and a first light exit surface. The first light exit surface is connected to the first light incident surface, and is disposed opposite to one of the display surface and the back surface of the display panel. The first light source is disposed on a side of the first light incident surface of the first light guide structure.

In an embodiment of the disclosure, the first light guide structure of the display apparatus is a light guide plate. An optical adhesive layer is disposed between the light guide plate and the display panel. The optical adhesive layer is connected to the first light exit surface of the light guide plate and the display surface of the display panel.

In an embodiment of the disclosure, the first light guide structure of the display apparatus is a light guide plate. An air gap layer is disposed between the light guide plate and the display panel. The air gap layer exposes the first light exit surface of the light guide plate and the display surface of the display panel.

In an embodiment of the disclosure, the first light incident surface of the first light guide structure of the display apparatus includes a first sub-surface and a second sub-surface and a third sub-surface, the second sub-surface and the third sub-surface bent and extended from two opposite sides of the first sub-surface. The first light source includes multiple first light emitting devices and multiple second light emitting devices. At least some of the first light emitting devices are disposed on a side of the first sub-surface of the first light guide structure. The second light emitting devices are disposed on two sides of the second sub-surface and the third sub-surface of the first light guide structure. The first light emitting devices are adapted to emit a light beam with a first color temperature. The second light emitting devices are adapted to emit a light beam with a second color temperature. The second color temperature is different from the first color temperature.

In an embodiment of the disclosure, included angles between the second sub-surface and the third sub-surface of the display apparatus respectively and a virtual extension surface of the first sub-surface are in a range of 30 degrees to 40 degrees.

In an embodiment of the disclosure, the first light guide structure of the display apparatus further has a fourth sub-surface connected to the second sub-surface and the third sub-surface and opposite to the first sub-surface. Some of the first light emitting devices are disposed on a side of the fourth sub-surface of the first light guide structure. Included angles between the second sub-surface and the third sub-surface respectively and the first sub-surface or the fourth sub-surface are 90 degrees.

In an embodiment of the disclosure, the first light source of the display apparatus further includes multiple third light emitting devices disposed on the two sides of the second sub-surface and the third sub-surface of the first light guide structure. The third light emitting devices are adapted to emit a light beam with a third color temperature. The third color temperature is different from the first color temperature. The second color temperature is 2700K, and the third color temperature is 5000K.

In an embodiment of the disclosure, the first light source module of the display apparatus is disposed on a side of the display surface of the display panel. The first light guide structure is a light guide bar or an optical fiber and is disposed around the display surface of the display panel.

In an embodiment of the disclosure, the first light source module of the display apparatus is disposed on a side of the display surface of the display panel. The second light source module is disposed on a side of the back surface of the display panel, and includes a circuit back plate and multiple light emitting devices. The light emitting devices are disposed in an array on the circuit back plate and electrically connected to the circuit back plate.

In an embodiment of the disclosure, the circuit back plate of the display apparatus is adapted to control the light emitting devices to emit light independently.

In an embodiment of the disclosure, the second light source module of the display apparatus includes a second light guide structure and a second light source. The second light guide structure has a second light incident surface and a second light exit surface. The second light exit surface is connected to the second light incident surface, and is disposed opposite to the other one of the display surface and the back surface of the display panel. The second light source is disposed on a side of the second light incident surface of the second light guide structure.

Based on the above, in the display apparatus according to an embodiment of the disclosure, the two light source modules are respectively disposed on the two opposite sides of the display surface and the back surface of the display panel. One of the light source modules is configured to provide illumination light required for the display panel, and the other light source module is configured to adjust the color and the color temperature of the display image. Through the above combination and collocation, different application requirements for the display apparatus may be met.

BRIEF DESCRIPTION OF THE DRAWINGS

FIG. 9 is a schematic top view of a first light source module in FIG. 8.

DETAILED DESCRIPTION OF DISCLOSED EMBODIMENTS

Figure 1:
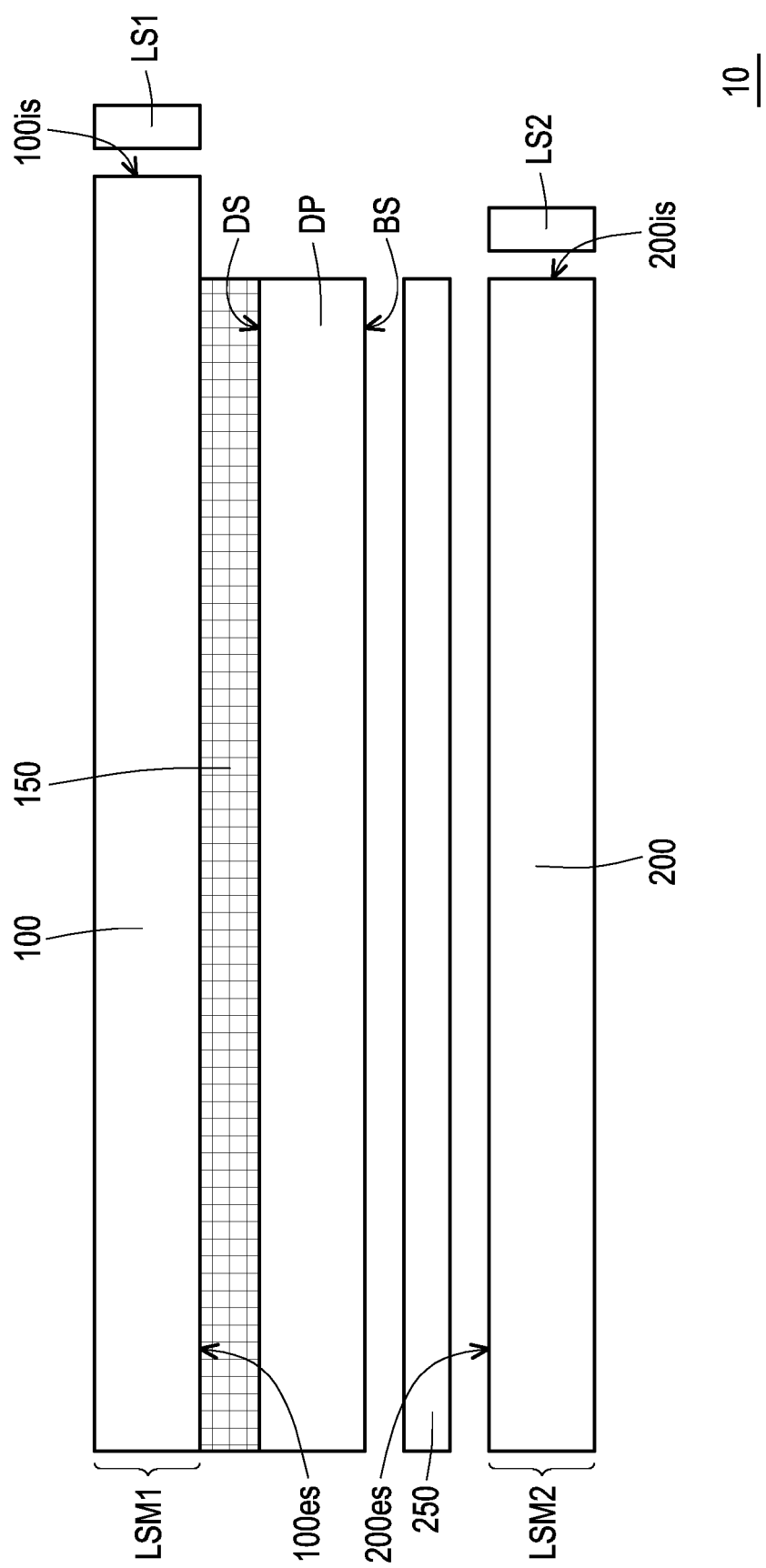
FIG. 1 is a schematic cross-sectional view of a display apparatus according to the first embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Figure 2:
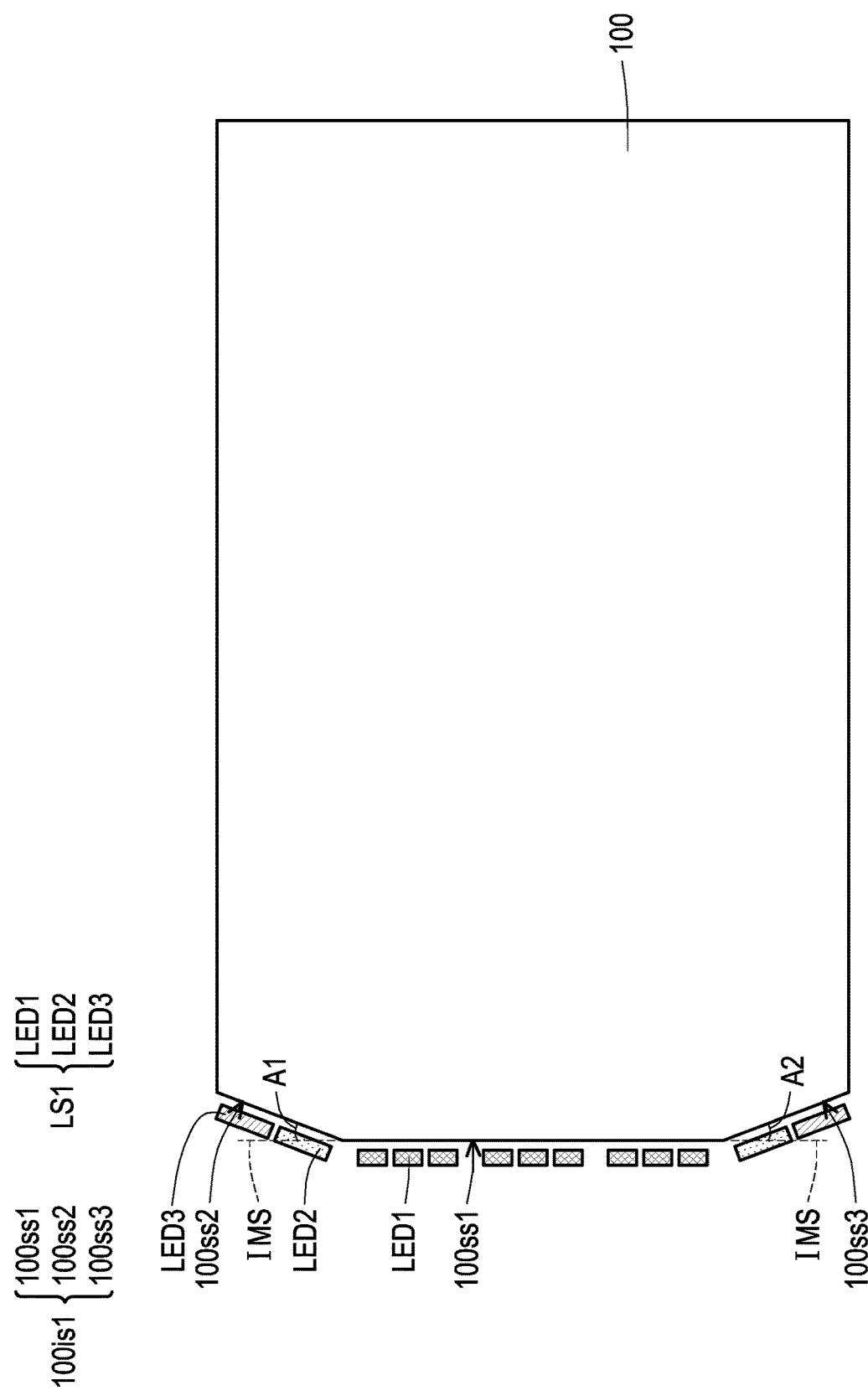
FIG. 2 is a schematic top view of a first light source module in FIG. 1.
Figure 3:
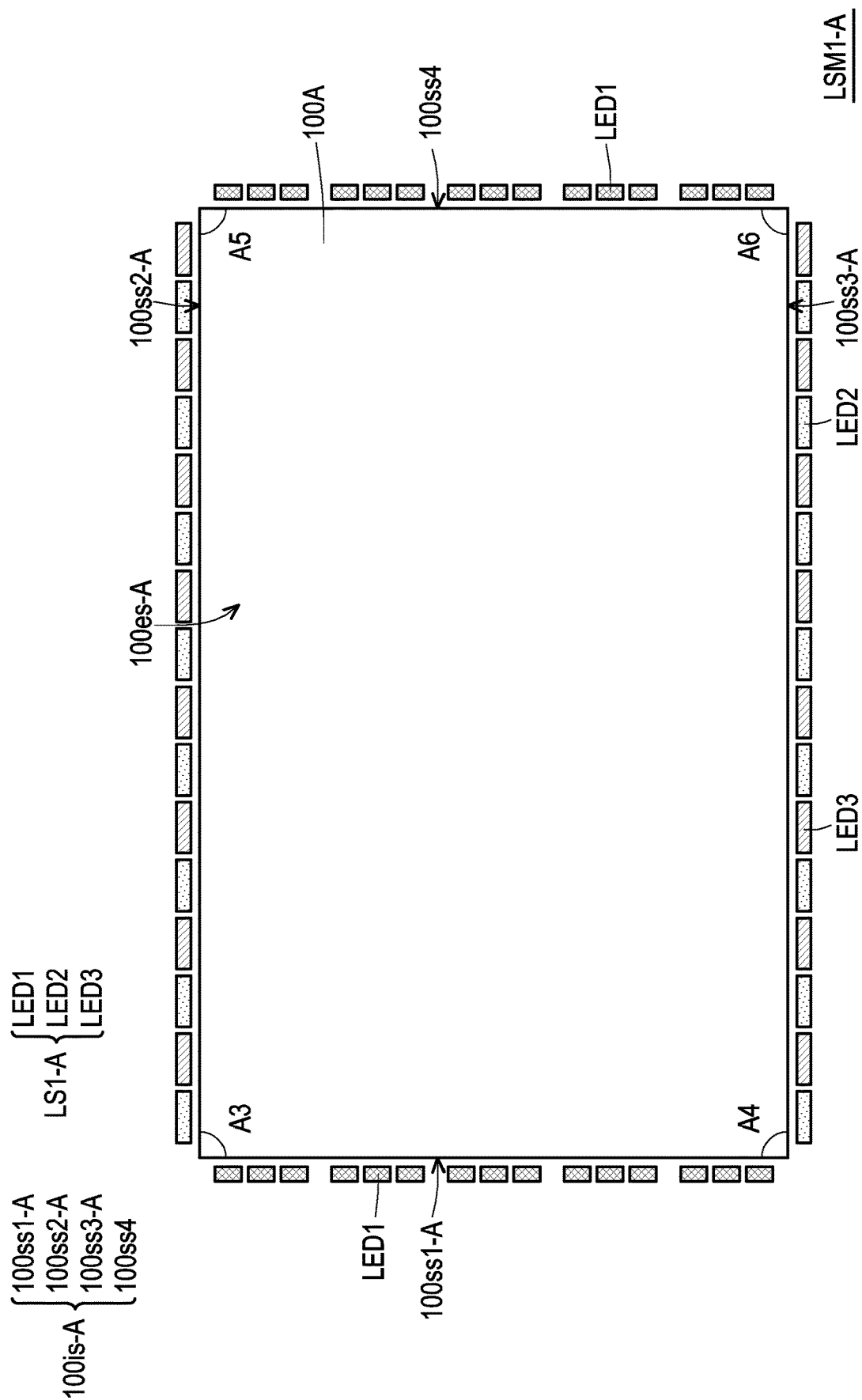
FIG. 3 is a schematic top view of a first light source module according to another modified embodiment of the disclosure.
Figure 4:
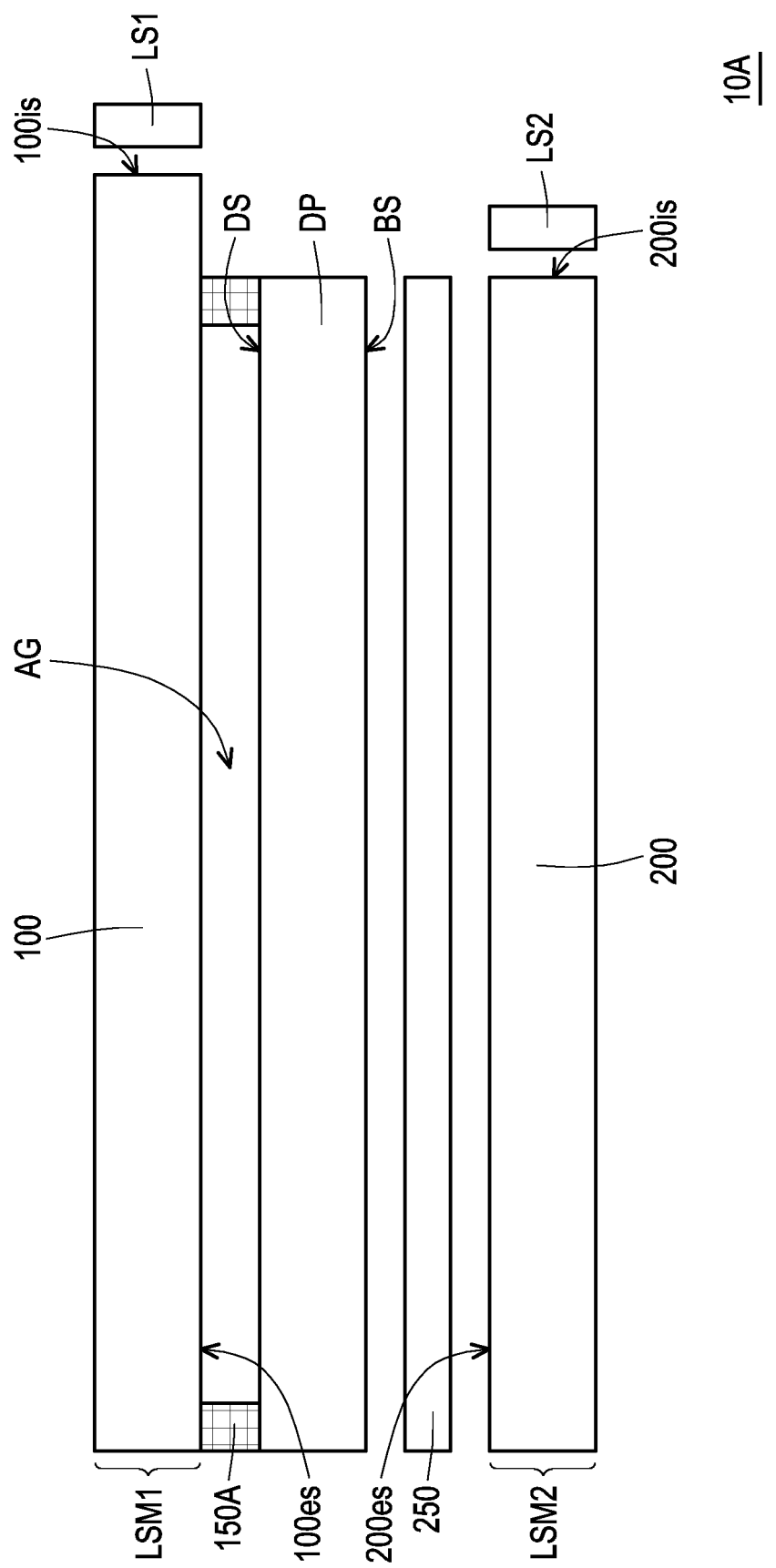
FIG. 4 is a schematic cross-sectional view of a display apparatus according to the second embodiment of the disclosure.

FIG. 1 is a schematic cross-sectional view of a display apparatus according to the first embodiment of the disclosure. FIG. 2 is a schematic top view of a first light source module in FIG. 1. FIG. 3 is a schematic top view of a first light source module according to another modified embodiment of the disclosure. FIG. 4 is a schematic cross-sectional view of a display apparatus according to the second embodiment of the disclosure.

Referring to FIG. 1, a display apparatus 10 includes a display panel DP, a first light source module LSM1, and a second light source module LSM2. The display panel DP has a display surface DS and a back surface BS away from the display surface DS. In this embodiment, the first light source module LSM1 is disposed on a side of the display surface DS of the display panel DP, and overlaps the display surface DS. The second light source module LSM2 is disposed on a side of the back surface BS of the display panel DP, and overlaps the display surface DS. In this embodiment, the display panel DP may be a transflective display panel or a micro transflective display panel. The first light source module LSM1 may be used as a front light module of the display panel DP, and the second light source module LSM2 may be used as a back light module of the display panel DP. However, the disclosure is not limited thereto.

In this embodiment, the first light source module LSM1 may be an edge-type front light module, which may include a first light guide structure 100 and a first light source LS1. The first light guide structure 100 has a first light incident surface 100$is$ and a first light exit surface 100$es$. The first light exit surface 100$es$ is connected to the first light incident surface 100$is$, and is disposed opposite to the display surface DS of the display panel DP. The first light source LS1 is disposed on a side of the first light incident surface 100$is$ of the first light guide structure 100. In this embodiment, the first light guide structure 100 may be a light guide plate, a material of which includes, for example, polymethyl methacrylate (PMMA), polycarbonate (PC), or cyclo olefin copolymer (COP).

Referring to FIG. 2, in detail, the first light incident surface 100$is$ of the first light guide structure 100 may include a first sub-surface 100$ss1$ and a second sub-surface 100$ss2$ and a third sub-surface 100$ss3$ bent and extended from two opposite sides of the first sub-surface 100$ss1$. In this embodiment, an included angle A1 between the second sub-surface 100$ss2$ and a virtual extension surface IMS of the first sub-surface 100$ss1$ and an included angle A2 between the third sub-surface 100$ss3$ and the virtual extension surface IMS of the first sub-surface 100$ss1$ may be in a range of 30 degrees to 40 degrees.

The first light source LS1 may include multiple first light emitting devices LED1 and multiple of second light emitting devices LED2. The first light emitting devices LED1 are disposed on a side of the first sub-surface 100$ss1$ of the first light guide structure 100. The second light emitting devices LED2 are disposed on two sides of the second sub-surface 100$ss2$ and the third sub-surface 100$ss3$ of the first light guide structure 100. It should be noted that the first light emitting devices LED1 are adapted to emit a light beam with a first color temperature, and the second light emitting devices LED2 are adapted to emit a light beam with a second color temperature. The first color temperature is different from the second color temperature.

That is to say, in this embodiment, the first light source module LSM1 not only may provide an illumination beam required for the display panel DP to display when ambient light is insufficient, but also has a function of adjusting a color temperature of a display image. Further, the first light source LS1 may further include multiple third light emitting devices LED3 disposed on the two sides of the second sub-surface 100$ss2$ and the third sub-surface 100$ss3$ of the first light guide structure 100. The third light emitting devices LED3 are adapted to emit a light beam with a third color temperature, and the third color temperature is different from the second color temperature and the first color temperature. For example, the second color temperature is 2700K. and the third color temperature is 5000K. However, the disclosure is not limited thereto. In this embodiment, emission colors of the first light emitting devices LED1 include, for example, red, green, and blue, and emission colors of the second light emitting devices LED2 and the third light emitting devices LED3 include, for example, yellow, lake blue, color, and magenta.

In this embodiment, the first light emitting device LED1, the second light emitting device LED2, and the third light emitting device LED3 may be light emitting diodes (such as micro light emitting diodes or mini light emitting diodes). However, the disclosure is not limited thereto.

In particular, the first light source module LSM1 is suitable for the display apparatus with a display size below 8 inches. Referring to FIG. 3, in order to enable the display apparatus with a display size higher than 8 inches to also have the function of adjusting the color temperature, in another modified embodiment, a first light incident surface 100is-A of a first light guide structure 100A of a first light source module LSM1-A may further include a fourth sub-surface 100ss4. The fourth sub-surface 100ss4 is connected to a second sub-surface 100ss2-A and a third sub-surface 100ss3-A, and is disposed opposite to a first sub-surface 100ss1-A. It is particularly noted that the first light emitting devices LED1 are also disposed on a side of the fourth sub-surface 100ss4 of the first light guide structure 100A.

In the modified embodiment, an included angle A3 between the first sub-surface 100ss1-A and the second sub-surface 100ss2-A, an included angle A4 between the first sub-surface 100ss1-A and the third sub-surface 100ss3-A, an included angle A5 between the second sub-surface 100ss2-A and the fourth sub-surface 100ss4, and an included angle A6 between the third sub-surface 100ss3-A and the fourth sub-surface 100ss4 are all 90 degrees. That is to say, the first light incident surface 100is-A of the first light guide structure 100A in the modified embodiment is rectangular in a normal direction of a first light exit surface 100es-A. The first light emitting devices LED1 for illumination are respectively disposed on two opposite sides of the first light guide structure 100A along a first direction. The second light emitting devices LED2 and the third light emitting devices LED3 for adjusting the color temperature are respectively disposed on the two opposite sides of the first light guide structure 100A along a second direction. The first direction is perpendicular to the second direction.

Referring to FIG. 1, in this embodiment, an optical adhesive layer 150 is disposed between the first light guide structure 100 and the display panel DP, and the optical adhesive layer 150 is connected to the first light exit surface 100es of the first light guide structure 100 and the display surface DS of the display panel DP. The optical adhesive layer 150 is, for example, formed by optically clear resin (OCR), an optically clear adhesive (OCA), or other suitable optical-grade adhesive materials coated on the display surface DS. However, the disclosure is not limited thereto. In another embodiment of FIG. 4, a fixed relationship between the first light guide structure 100 of a display apparatus 10A and the display panel DP may also be implemented through an air adhesive (tape) 150A distributed around the display surface DS. That is, an air gap layer AG defined by the air adhesive (tape) 150A may be disposed between the first light guide structure 100 and the display panel DP, and the air gap layer AG exposes the first light exit surface 100es of the first light guide structure 100 and the display surface DS of the display panel DP.

Continuing to refer to FIG. 1, in this embodiment, the second light source module LSM2 may be an edge-type back light module, which may include a second light guide structure 200 and a second light source LS2. The second light guide structure 200 has a second light incident surface 200is and a second light exit surface 200es. The second light exit surface 200es is connected to the second light incident surface 200is, and is disposed opposite to the back surface BS of the display panel DP. The second light source LS2 is disposed on a side of the second light incident surface 200is of the second light guide structure 200. For example, in this embodiment, the second light source module LSM2 may provide the illumination beam required for the display panel DP to display when the ambient light is insufficient, and a light beam emitted by the second light source LS2 has only a single color temperature. That is, the second light source module LSM2 as the back light module does not have the function of adjusting the color temperature. The second light guide structure 200 may be the light guide plate, a material of which includes, for example, polymethyl methacrylate (PMMA), polycarbonate (PC), or cyclo olefin copolymer (COP).

The first light source module LSM1 and the second light source module LSM2 are respectively disposed on the two opposite sides of the display surface DS and the back surface BS of the display panel DP, which may increase design flexibility of the display apparatus 10 to meet different application requirements. On the other hand, the second light source module LSM2 and the display panel DP may optionally be provided with an optical film 250. The optical film 250 includes, for example, a diffusion film, an optical brightness enhancement film, at least one prism sheet, or a combination thereof.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 5:
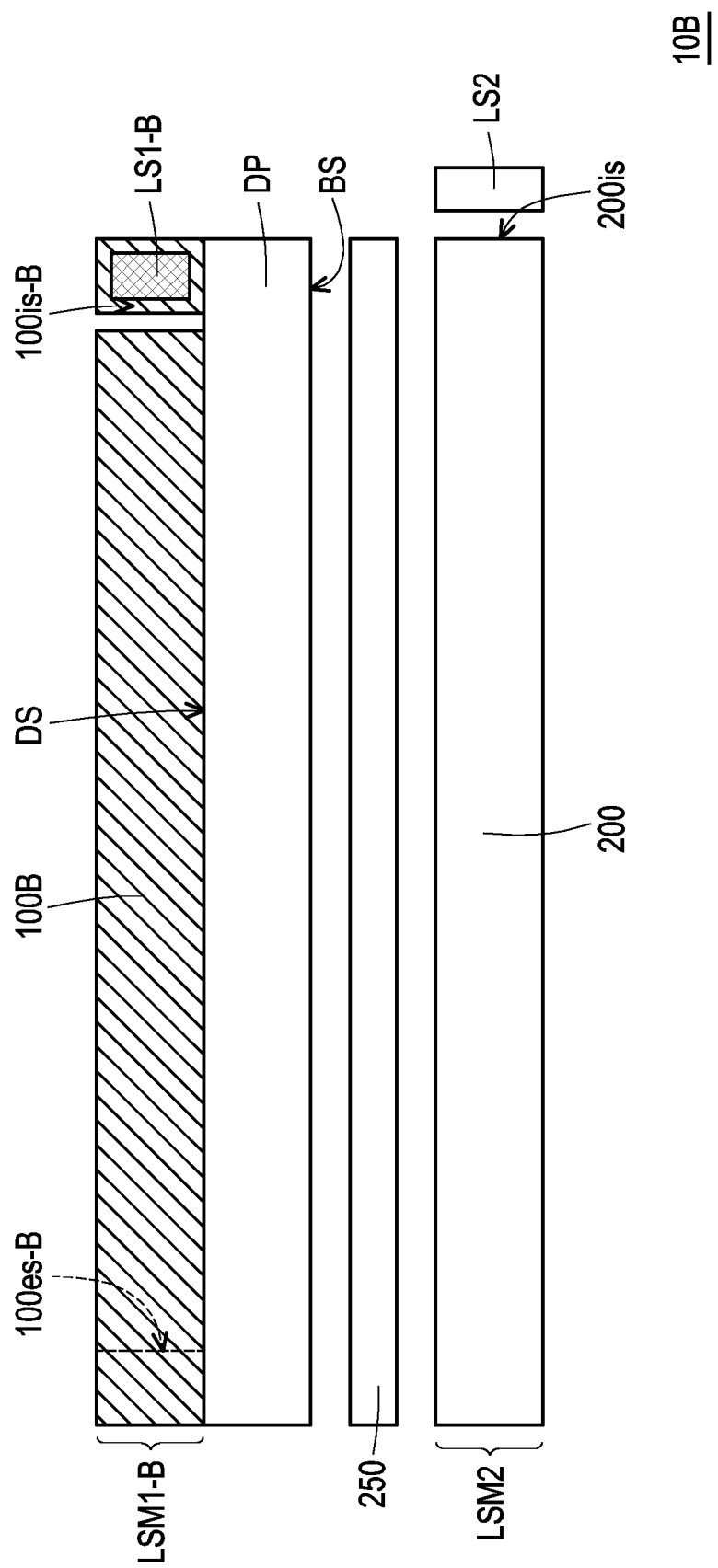
FIG. 5 is a schematic side view of a display apparatus according to the third embodiment of the disclosure.
Figure 6:
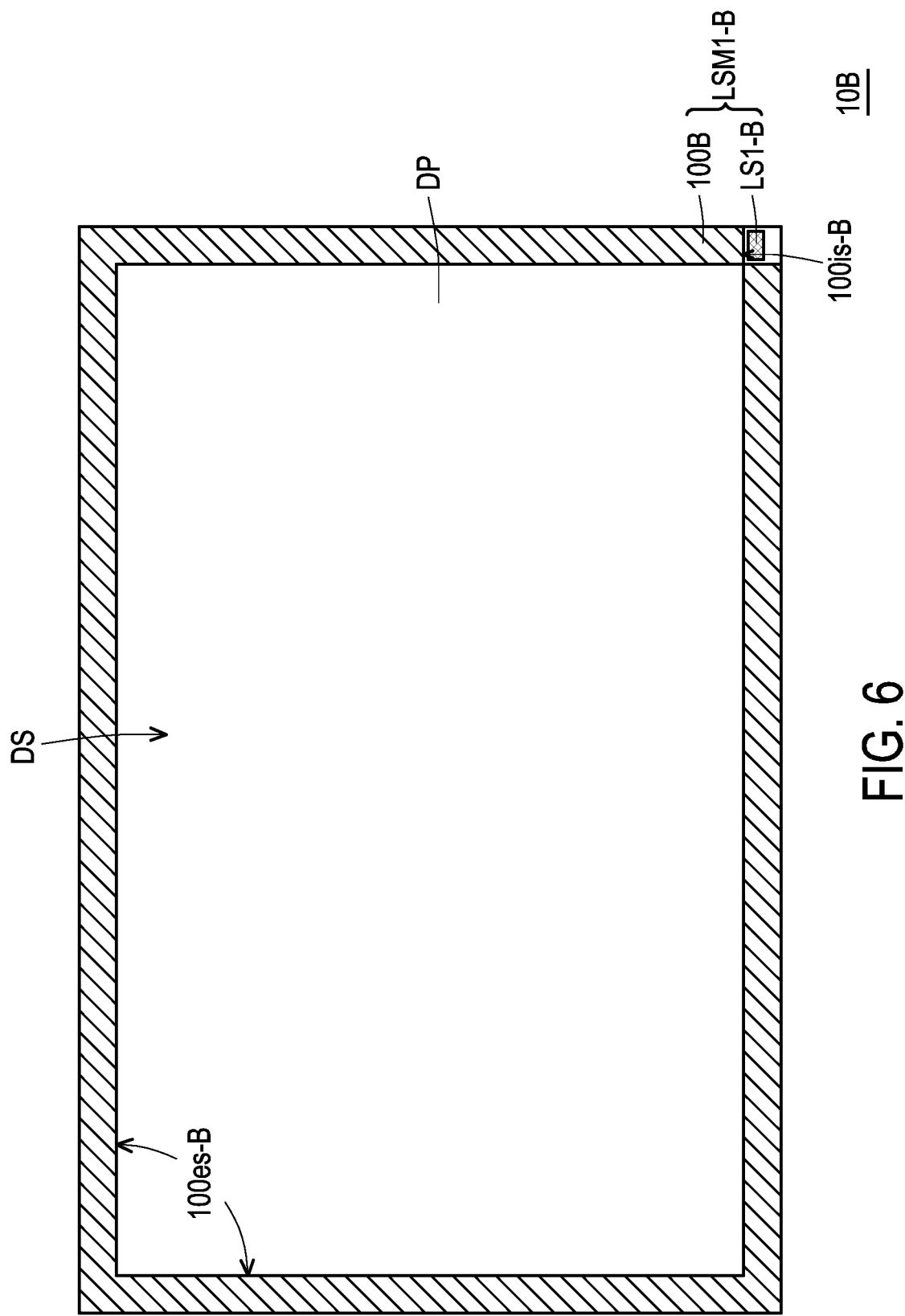
FIG. 6 is a schematic top view of the display apparatus in FIG. 5.

FIG. 5 is a schematic side view of a display apparatus according to the third embodiment of the disclosure. FIG. 6 is a schematic top view of the display apparatus in FIG. 5. Referring to FIGS. 5 and 6, a difference between a display apparatus 10B in this embodiment and the display apparatus 10 in FIG. 1 lies in that a structure of the first light source module is different. Specifically, in this embodiment, a first light guide structure 100B of a first light source module LSM1-B of the display apparatus 10B may be a light guide bar or an optical fiber, and is disposed around the display surface DS of the display panel DP.

It should be noted that in this embodiment, a first light exit surface 100es-B and a first light incident surface 100is-B of the first light guide structure 100B may be optionally perpendicular to the display surface DS of the display panel DP, and the first light exit surface 100es-B is substantially rectangular in a normal direction of the display surface DS. In this embodiment, a first light source LS1-B may be a light emitting diode (such as a micro light emitting diode or a mini light emitting diode) or a laser element. However, the disclosure is not limited thereto.

Figure 7:
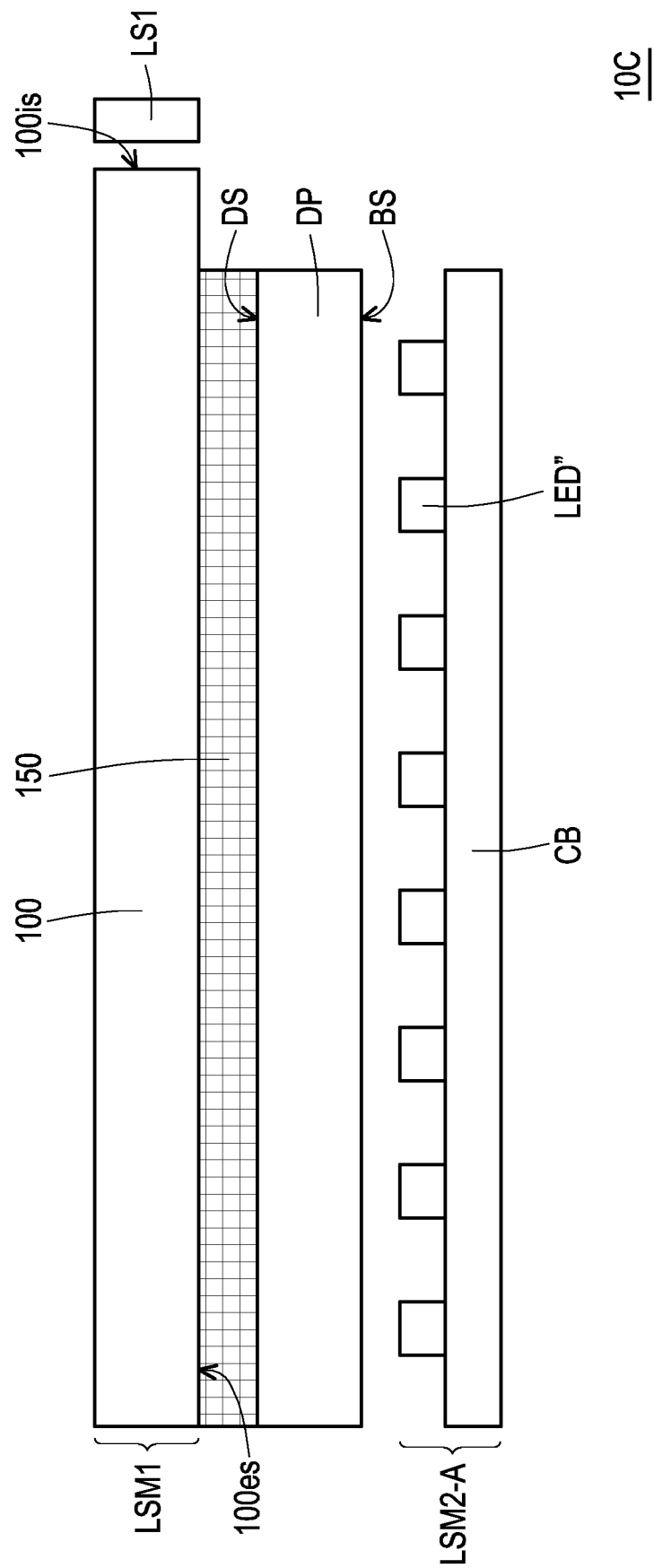
FIG. 7 is a schematic cross-sectional view of a display apparatus according to the fourth embodiment of the disclosure.

FIG. 7 is a schematic cross-sectional view of a display apparatus according to the fourth embodiment of the disclosure. Referring to FIG. 7, a difference between a display apparatus 10C in this embodiment and the display apparatus 10 in FIG. 1 lies in that a structure of the second light source module is different. Specifically, in the display apparatus 10C of this embodiment, a second light source module LSM2-A may be a direct type back light module, and may include a circuit back plate CB and multiple light emitting devices LED". The light emitting devices LED" are arranged in an array on a surface of the circuit back plate CB facing the display panel DP, and are electrically connected to the circuit back plate CB.

In this embodiment, the circuit back plate CB is adapted to control the light emitting devices LED" to emit light independently. Therefore, different light emitting areas may have different light emitting brightnesses, that is, local dimming. Accordingly, display contrast of the display apparatus 10C may be effectively improved. However, the disclosure is not limited thereto. In an unillustrated modified embodiment, the light emitting devices of the second light source module may be arranged at intervals on the circuit back plate in a form of multiple light bars, and the circuit back plate is adapted to control the light bars to emit the light independently. Therefore, the line dimming may be implemented. In particular, a function of the line dimming is also suitable for an edge-type light source module (such as the second light source module LSM2 in FIG. 5).

On the other hand, in this embodiment, the optical film 250 in FIG. 1 is not disposed between the display panel DP and the second light source module LSM2-A.

Figure 8:
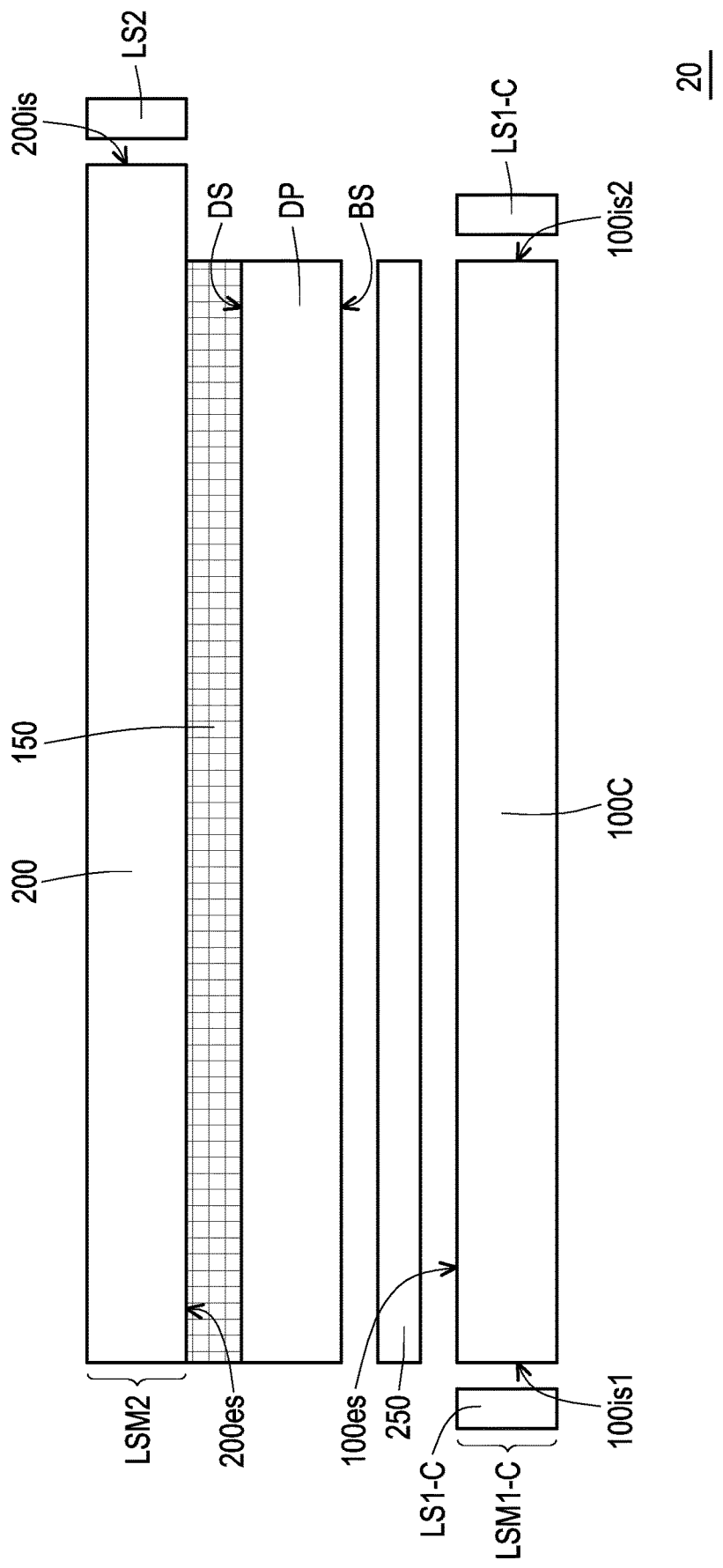
FIG. 8 is a schematic cross-sectional view of a display apparatus according to the fifth embodiment of the disclosure.

FIG. 8 is a schematic cross-sectional view of a display apparatus according to the fifth embodiment of the disclosure. FIG. 9 is a schematic top view of a first light source module in FIG. 8. Referring to FIGS. 8 and 9, a difference between a display apparatus 20 in this embodiment and the display apparatus 10 in FIG. 1 lies in that a configuration relationship between the two light source modules and the display panel and a composition structure of the first light source module are different.

In the display apparatus 20 of this embodiment, a first light source module LSM1-C may be used as the back light module of the display panel DP, and the second light source module LSM2 may be used as the front light module of the display panel DP. However, the disclosure is not limited thereto. It should be noted that in this embodiment, a first light guide structure 100C of the first light source module LSM1-C may have a light incident surface 100$is$1 and a light incident surface 100$is$2 opposite to each other, and a first light source LS1-C is disposed on two sides of the two light incident surfaces of the first light guide structure 100C.

In detail, in this embodiment, a method of disposing the light incident surface 100$is$1 of the first light guide structure 100C and the first light source LS1-C on a side of the light incident surface 100$is$1 of the first light guide structure 100C is similar to a method of disposing the first light incident surface 100$is$ of the first light guide structure 100 of the first light source module LSM1 and the first light source LS1 on a side of the light incident surface 100$is$ of the first light guide structure 100 in FIG. 2. Therefore, relevant paragraphs of the aforementioned embodiments may be referred for detailed description. Therefore, the same details will not be repeated in the following.

Different from the first light source module LSM1 shown in FIG. 2, another light incident surface 100$is$2 of the first light guide structure 100C in this embodiment may also include a first sub-surface 100$ss$1", a second sub-surface 100$ss$2", and a third sub-surface 100$ss$3". A configuration relationship between the sub-surfaces of the light surface 100$is$2 is optionally the same as a configuration relationship among the first sub-surface 100$ss$1, the second sub-surface 100$ss$2, and the third sub-surface 100$ss$3 of the light incident surface 100$is$1. Therefore, the same details will not be repeated in the following.

It should be noted that in this embodiment, the first light guide structure 100C is also provided with the second light emitting devices LED2 and the third light emitting devices LED3 on two sides of the second sub-surface 100$ss$2" and the third sub-surface 100$ss$3" of the light incident surface 100$is$2, configured to adjust the color temperature of the display image. More specifically, different from the display apparatus 10 in FIG. 1, in this embodiment, the first light source module LSM1-C with the functions of lighting and adjusting the color temperature of the display image may also be used as the back light module of the display panel DP.

Based on the above, in the display apparatus according to an embodiment of the present invention, the two light source modules are respectively disposed on the two opposite sides of the display surface and the back surface of the display panel. One of the light source modules is configured to provide illumination light required for the display panel, and the other light source module is configured to adjust the color and the color temperature of the display image. Through the above combination and collocation, different application requirements for the display apparatus may be met.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A display apparatus, comprising:
   a display panel having a display surface and a back surface away from the display surface;
   a first light source module disposed on a side of the display surface of the display panel and overlapping the display surface, wherein the first light source module comprises:
      a first light guide structure having a first light incident surface and a first light exit surface, wherein the first light exit surface is connected to the first light incident surface, and is disposed opposite to the display surface of the display panel; and
      a first light source disposed on a side of the first light incident surface of the first light guide structure; and
   a second light source module disposed on a side of the back surface of the display panel and overlapping the display surface, wherein the second light source module comprises:
      a circuit back plate; and
      a plurality of light emitting devices disposed in an array on the circuit back plate and electrically connected to the circuit back plate, wherein the circuit back plate is adapted to control the light emitting devices to emit light independently.

2. A display apparatus, comprising:
   a display panel having a display surface and a back surface away from the display surface;
   a first light source module disposed on a side of one of the display surface and the back surface of the display panel and overlapping the display surface, wherein the first light source module comprises:
      a first light guide structure having a first light incident surface and a first light exit surface, wherein the first light exit surface is connected to the first light incident surface, and is disposed opposite to one of the display surface and the back surface of the display panel; and
      a first light source disposed on a side of the first light incident surface of the first light guide structure; and
   a second light source module disposed on a side of the other one of the display surface and the back surface of the display panel and overlapping the display surface, wherein the first light incident surface of the first light guide structure comprises a first sub-surface and a second sub-surface and a third sub-surface, the second sub-surface and the third sub-surface bent and extended from two opposite sides of the first sub-surface, the first light source comprises a plurality of first light emitting devices and a plurality of second light emitting devices, at least some of the first light emitting devices are disposed on a side of the first sub-surface of the first light guide structure, and the second light emitting devices are disposed on two sides of the second sub-surface and the third sub-surface of the first light guide structure, wherein the first light emitting devices are adapted to emit a light beam with a first color temperature, the second light emitting devices are adapted to emit a light beam with a second color temperature, and the second color temperature is different from the first color temperature.

3. The display apparatus according to claim 2, further comprising:
an optical adhesive layer, wherein the first light guide structure is a light guide plate, the optical adhesive layer is disposed between the light guide plate and the display panel, and the optical adhesive layer is connected to the first light exit surface of the light guide plate and the display surface of the display panel.

4. The display apparatus according to claim 2, wherein the first light guide structure is a light guide plate, an air gap layer is disposed between the light guide plate and the display panel, and the air gap layer exposes the first light exit surface of the light guide plate and the display surface of the display panel.

5. The display apparatus according to claim 2, wherein included angles between the second sub-surface and the third sub-surface respectively and a virtual extension surface of the first sub-surface are in a range of 30 degrees to 40 degrees.

6. The display apparatus according to claim 2, wherein the first light guide structure further has a fourth sub-surface connected to the second sub-surface and the third sub-surface and opposite to the first sub-surface, and some of the first light emitting devices are disposed on a side of the fourth sub-surface of the first light guide structure, wherein included angles between the second sub-surface and the third sub-surface respectively and the first sub-surface or the fourth sub-surface are 90 degrees.

7. The display apparatus according to claim 2, wherein the first light source further comprises a plurality of third light emitting devices disposed on the two sides of the second sub-surface and the third sub-surface of the first light guide structure, the third light emitting devices are adapted to emit a light beam with a third color temperature, and the third color temperature is different from the first color temperature, wherein the second color temperature is 2700K, and the third color temperature is 5000K.

8. The display apparatus according to claim 2, wherein the first light source module is disposed on a side of the display surface of the display panel, and the first light guide structure is a light guide bar or an optical fiber and is disposed around the display surface of the display panel.

9. The display apparatus according to claim 2, wherein the second light source module comprises:
a second light guide structure having a second light incident surface and a second light exit surface, wherein the second light exit surface is connected to the second light incident surface, and is disposed opposite to the other one of the display surface and the back surface of the display panel; and
a second light source disposed on a side of the second light incident surface of the second light guide structure.

* * * * *